(12) United States Patent
Asakawa et al.

(10) Patent No.: US 9,639,686 B2
(45) Date of Patent: May 2, 2017

(54) OPERATION LIMITING DEVICE, OPERATION LIMITING METHOD, AND STORAGE MEDIUM

(71) Applicant: TOKYO ELECTRON LIMITED, Tokyo (JP)

(72) Inventors: Teruo Asakawa, Tokyo (JP); Naoko Murata, Tokyo (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 109 days.

(21) Appl. No.: 14/389,223

(22) PCT Filed: Mar. 29, 2013

(86) PCT No.: PCT/JP2013/059463
§ 371 (c)(1),
(2) Date: Sep. 29, 2014

(87) PCT Pub. No.: WO2013/147120
PCT Pub. Date: Oct. 3, 2013

(65) Prior Publication Data
US 2015/0332039 A1    Nov. 19, 2015

(30) Foreign Application Priority Data
Mar. 30, 2012  (JP) ................. 2012-081497

(51) Int. Cl.
G06F 21/40        (2013.01)
G06F 17/30        (2006.01)

(52) U.S. Cl.
CPC .............. *G06F 21/40* (2013.01); *G06F 17/30* (2013.01)

(58) Field of Classification Search
USPC ............................................ 700/245; 726/2
See application file for complete search history.

(56) References Cited

U.S. PATENT DOCUMENTS

2005/0174988 A1    8/2005  Bieber et al.
2005/0223008 A1*  10/2005  Kubota .................. G06F 21/40
(Continued)

FOREIGN PATENT DOCUMENTS

EP        1564928 A1     8/2005
JP     03-223901 A      10/1991
(Continued)

OTHER PUBLICATIONS

International Search Report dated Jun. 25, 2013 corresponding to application No. PCT/JP2013/059463.

*Primary Examiner* — Jeffrey Pwu
*Assistant Examiner* — Samuel Ambaye
(74) *Attorney, Agent, or Firm* — Nath, Goldberg & Meyer; Jerald L. Meyer

(57) ABSTRACT

Provided is an operation limiting device which makes it possible to achieve more robust security and safety in processing of a workpiece by a processing apparatus. The operation limiting device limits operations relating to processing of a workpiece by a processing apparatus, and is provided with: an authentication unit for authenticating each of a plurality of users; a receiving unit for receiving an operation request or permission for said operation, from a plurality of authenticated users; an operation enabling unit for enabling an operation if an operation request or permission has been received from the plurality of authenticated users; and a releasing unit for releasing the operation enabled state set by the operation enabling unit if processing relating to the operation has terminated or if a predetermined period of time corresponding to the operation has elapsed.

11 Claims, 15 Drawing Sheets

(56) References Cited

U.S. PATENT DOCUMENTS

| | | | |
|---|---|---|---|
| 2010/0231355 A1* | 9/2010 | Okuma | G06F 21/6218 340/5.8 |
| 2010/0269153 A1* | 10/2010 | Kato | G06F 21/31 726/3 |
| 2011/0030000 A1* | 2/2011 | Tojima | G08C 17/00 725/28 |

FOREIGN PATENT DOCUMENTS

| | | |
|---|---|---|
| JP | 08-227835 A | 9/1996 |
| JP | 2002-297844 A | 10/2002 |
| JP | 2007-329284 A | 12/2007 |
| JP | 2008-263396 A | 10/2008 |
| JP | 2009-271751 A | 11/2009 |
| JP | 2010-117885 A | 5/2010 |

* cited by examiner

FIG. 3

| User ID | User Name | Authentication Information | Right | Qualification |
|---------|-----------|----------------------------|-------|---------------|
| 11111 | AAAAA | X0Yasd | R, M, S | R1,M1,S1 |
| 22222 | BBBBB | XnY1Z2 | R, M, S | R2,M2,S2 |
| 33333 | CCCCC | Xasdfoij | R, M, S | S3 |
| ⋮ | ⋮ | ⋮ | ⋮ | ⋮ |

| Important operation contents | Authentication type | User | | | | | | Log notification destination |
|---|---|---|---|---|---|---|---|---|
| | | 1 | | 2 | | 3 | | |
| | | Requirement | Terminal | Requirement | Terminal | Requirement | Terminal | |
| Recipe retrieval | 2 | Right R Qualification R1 | First | Right R Qualification R2 | Unlimited | — | — | User 2 |
| Mechanism adjustment | 2 | Right M Qualification M1 | First | Right M Qualification M2 | Second | — | — | User 2 |
| Remote support | 3 | Right S Qualification S1 | First | Right S Qualification S2 | Second | Right S Qualification S3 | Remote | User 2, 3 |
| ... | ... | ... | ... | ... | ... | ... | ... | ... |

20b

OPERATION LIMITING DEVICE, OPERATION LIMITING METHOD, AND STORAGE MEDIUM

This is a National Phase Application filed under 35 U.S.C. 371 as a national stage of PCT/JP2013/059463, filed Mar. 29, 2013, an application claiming the benefit of Japanese Application No. 2012-081497, filed Mar. 30, 2012, the content of each of which is hereby incorporated by reference in its entirety.

TECHNICAL FIELD

The present disclosure relates to an operation limiting device, an operating limiting method and a computer program, which are capable of limiting operations relating to processing of a workpiece by a processing device.

BACKGROUND

An operation limiting device allows a user to set a right of access for accessing operation instructions and parameters for a semiconductor manufacturing apparatus and data from the semiconductor manufacturing apparatus. There have been proposed techniques in which according to the right of access previously set, the level of the right of access given to a user regulated based on the authentication of the user so that operation instructions operable by the user and parameters and data relating to the operation instructions can be limited (see Patent Documents 1 to 3). Setting an appropriate right of access can prevent erroneous operations of a semiconductor manufacturing apparatus due to user's lack of expertise and improper operations thereof due to user's poor qualification. In addition, stricter user authentication is considered to prevent a theft of data such as processing recipes of a semiconductor manufacturing apparatus.

As authentication means for user identification, passwords are commonly used. Also, there have been proposed biometric identification techniques using fingerprints, eye's capillaries and the like in order to prevent counterfeit authentication.

PRIOR ART DOCUMENTS

Patent Documents

Patent Document 1: Japanese laid-open publication No. H3-223901
Patent Document 2: Japanese laid-open publication No. H8-227835
Patent Document 3: Japanese laid-open publication No. 2007-329284

However, no matter how strict the user authentication is made and the user's right of access is managed, it is not equipped to protect a semiconductor manufacturing apparatus from operations due to user's or errors. For example, a malicious user who possesses authentication information may easily steal processing recipes from a semiconductor manufacturing apparatus. In addition, even an expert user who has the full right of access to an operation may inadequately carry out the operation due to errors such as lack of confirmation and the like.

The present disclosure provides some embodiments of an operation limiting device, an operating limiting method and a computer program, which are capable of realizing more robust security or safety relating to processing of a workpiece by a processing device.

The term "security" used herein refers to legitimately performing an operation relating to processing of a workpiece in a business point of view and protecting the related object other than the workpiece, devices and information from theft or destruction due to intended or unintended acts. The term "safety" used herein refers to legitimately performing an operation relating to processing of a workpiece in a technical point of view and protecting the related object other than the workpiece, devices, information, and users from dangers or damages.

SUMMARY

According to one embodiment of the present disclosure, there is provided an operation limiting device that limits an operation relating to processing of a workpiece by a processing apparatus. The operation limiting device includes: an authentication unit that authenticates a plurality of users; a receiving unit that receives a request of the operation or permission of the operation from the plurality of users; an operation enabling unit that enables the operation if the plurality of users is authenticated and if the operation request or permission is received from the plurality of users; and a release unit that releases an operation enabled state set by the operation enabling unit if processing relating to the operation is terminated or if a predetermined period of time according to the operation elapses after the enablement of the operation.

The operation limiting device may further include: a storage unit that stores authentication information of the users and attribute information of the users in association with the authentication information of the users, wherein the operation enabling unit enables the operation if the operation request or permission is received from a user who is authenticated and has predetermined attribute information.

The attribute information may include first attribute information and second attribute information, and the operation may be enabled if the operation request is received from an authenticated user having at least one of predetermined first attribute information and second attribute information, and if the operation permission is received from an authenticated user having at least one of different predetermined first attribute information and/or second attribute information.

The storage unit may store attribute information required for the operation request and permission based on importance of each of a plurality of operations.

The operation enabling unit may enable the operation by receiving the operation request or permission from a plurality of authenticated users at one or more required portions in a series of operations.

The receiving unit may include: a unit that receives a first operation request from a first authenticated user and a first operation permission from a second authenticated user; and a unit that receives a second operation request from the second authenticated user and a second operation permission from the first authenticated user.

If the operation request involves in a physical operation of the apparatus, the receiving unit may receive the operation request or permission in at least one terminal device arranged at a position where a state of the processing apparatus is confirmed.

The receiving unit may receive the operation request or permission in terminal devices arranged to be seen from each other by a plurality of users.

The operation limiting device may further include: a unit that stores identification information associated with a terminal device permitted to receive the operation request or a terminal device permitted to receive the operation permission, wherein the operation enabling unit enables the operation if the operation request or permission is received from the terminal device associated with the stored identification information.

The operation limiting device may further include: a unit that notifies a specified user of information indicating a performed-state of the authentication, the operation request, the operation permission, the operation or the processing relating to the operation.

The operation limiting device may further include: a unit that stores a performed-state of the authentication, the operation request, the operation permission, the operation or the processing relating to the operation.

According to another embodiment of the present disclosure, there is provided an operation limiting method for limiting an operation relating to processing of a workpiece by a processing apparatus. The operation limiting method includes: authenticating a plurality of users; receiving a request of the operation or permission of the operation from the plurality of users; enabling the operation if the plurality of users is authenticated and if the operation request or permission is received from the plurality of users; and releasing an operation enabled state if processing relating to the operation is terminated or if a predetermined period of time according to the operation elapses after the enablement of the operation.

According to another embodiment of the present disclosure, there is provided a computer program that causes a computer to limit an operation relating to processing of a workpiece by a processing apparatus. The computer program causes the computer to function as: an authentication unit that authenticates a plurality of users; a receiving unit that receives a request of the operation or permission of the operation from the plurality of users; an operation enabling unit that enables the operation if the plurality of users is authenticated and if the operation request or permission is received from the plurality of users; and a release unit that releases an operation enabled state set by the operation enabling unit if processing relating to the operation is terminated or if a predetermined period of time according to the operation elapses after the enablement of the operation.

In the present disclosure, the operation request or permission relating to processing of workpieces is received from a plurality of authenticated users. In addition, the operation is enabled on a single operation basis or on an operation group basis. The operation enabled state is released if the processing relating to the operation is terminated or if a predetermined period of time according to the operation elapses. Accordingly, it is possible to guarantee robust security or safety.

In addition, the operation relating to the processing of workpieces by the processing apparatus includes not only a direct operation for the processing apparatus but also an operation of information processing relating to processing of workpieces in the processing apparatus, which is performed on an information processing apparatus relating to the processing apparatus. In addition, in the operation enabled state, processing relating to a requested operation may be instantly performed or may be waited under conditions where the processing relating to the operation can be performed. In addition, the "authenticating" and "receiving the operation request or permission" in the operation limiting method may be performed in a reverse order. In addition, the "authenticating" may be performed for an appropriate number of times to check that a terminal user is not changed throughout a work period.

In the present disclosure, if the operation request or permission is received from a plurality of users, the operation is enabled after it is confirmed that attribute information required for the operation is associated with the users.

In the present disclosure, the operation request is received from an authenticated user having at least one of predetermined first attribute information and second attribute information, and the operation permission is received from an authenticated user having at least one of different predetermined first attribute information and second attribute information.

The first attribute information and the second attribute information are, for example, the right and qualification possessed by users.

The term "right" used herein refers to a level of a permitted user to perform operation request or permission from a standpoint of role or task. Therefore, even if a user has a right to any operation, this does not mean that the user has a sufficient expertise on the operation. The right is information for guaranteeing security relating to processing of workpieces.

The term "qualification" used herein refers to a level of a permitted user to perform operation request or permission from a standpoint of capability, i.e., an expertise required for a user to request or permit an operation. Therefore, even if a user has a qualification to any operation request or permission, this does not mean that the user has a right to the operation request or permission. The qualification is information for guaranteeing safety relating to processing of workpieces.

In the present disclosure, attribute information, which is required to perform the operation request or permission and depends on importance of the operation, is stored for each operation. Therefore, the present disclosure can realize more appropriate security and safety relating to processing of workpieces.

In the present disclosure, the operation is enabled by receiving the operation request or permission from a plurality of authenticated users at one or more required portions in a series of operations. For example, in a case that an operation group consists of a plurality of operation, an operation request and permission are received for each group of series of multiple operations, so that the multiple operations in the operation group are permitted. In this case, by performing the operation permission for each operation group, it is possible to guarantee more appropriate security and safety relating to processing of workpieces while reducing troublesomeness of the operation permission procedure. In addition, in the present disclosure, operation request and permission may be received for each operation so that the operation may be permitted. Since permission and release are performed on an operation basis in this case, the present disclosure can more reliably realize more appropriate security and safety relating to processing of workpieces.

In the present disclosure, operation request and permission are alternately received from a plurality of users. For example, there may be a case where a first user performs a first operation request and a second user performs an operation permission and a case where the second user performs a second operation request and the first user performs a second operation permission.

In the present disclosure, since operation request or permission is received in a terminal device arranged to see a state of the processing apparatus, it is possible to more reliably realize safety relating to processing of workpieces.

In the present disclosure, since operation request or permission is received in terminal devices arranged to be seen from each other by a plurality of users, it is possible to more reliably realize security relating to processing of workpieces.

In the present disclosure, since the operation is enabled if operation request or permission is received from a specified terminal device, it is possible to more reliably realize security and safety relating to processing of workpieces.

In the present disclosure, by notifying a specified user of one or any combination of various information indicating a performed-state of authentication, operation request, operation permission, operation and processing related to the operation, it is possible to indirectly improve security and safety relating to processing of workpieces.

In the present disclosure, by storing one or any combination of various information indicating a performed-state of authentication, operation request, operation permission, operation and processing related to the operation, it is possible to indirectly improve security and safety relating to processing of workpieces.

According to the present disclosure, it is possible to realize more robust security or safety relating to processing of workpieces by a processing apparatus.

BRIEF DESCRIPTION OF THE DRAWINGS

FIG. 3 is an explanatory view conceptually showing one example of a record layout of a user DB.

FIG. 4 is an explanatory view conceptually showing one example of a record layout of an important operation DB.

DETAILED DESCRIPTION

Embodiments of the present disclosure will now be described in detail with reference to the accompanying drawings.

<Embodiment 1>

Figure 1:
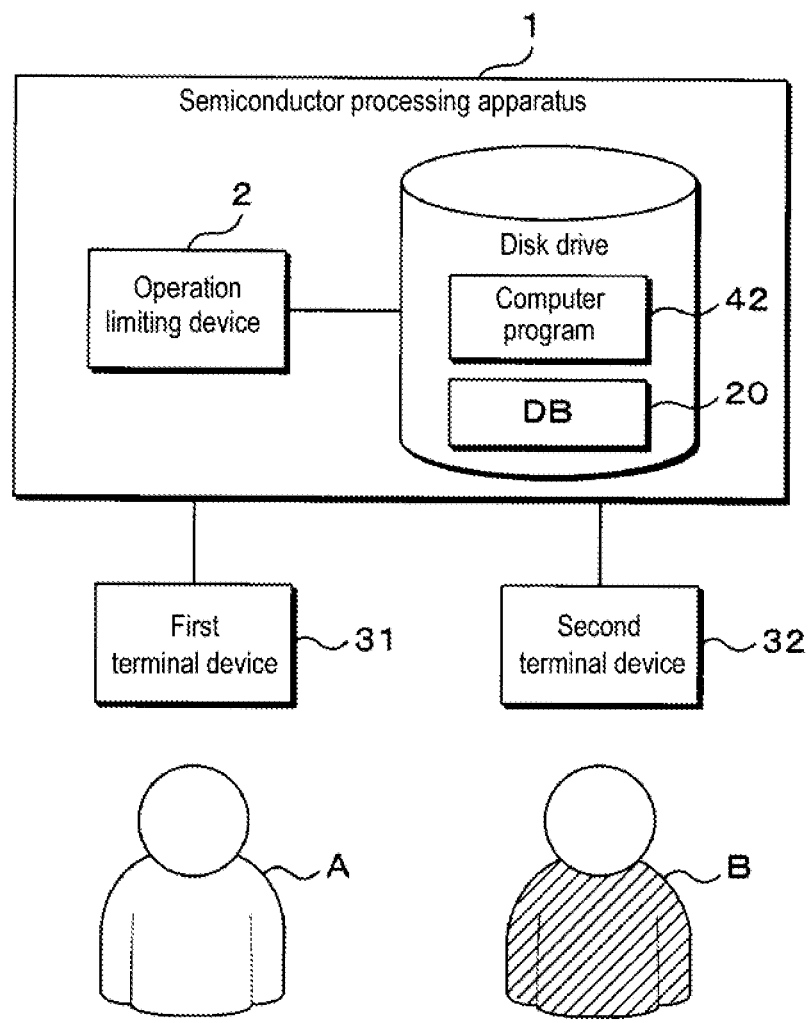
FIG. 1 is a block diagram showing one configuration example of a semiconductor processing apparatus including an operation limiting device according to Embodiment 1.

FIG. 1 is a block diagram showing one configuration example of a semiconductor processing apparatus 1 including an operation limiting device 2 according to Embodiment 1. The semiconductor processing apparatus 1 according to Embodiment 1 includes the operation limiting device 2 for limiting operations relating to processing of a workpiece by the semiconductor processing apparatus 1, and is connected with first and second terminal devices 31 and 32, each of which receives a request to operate the semiconductor processing apparatus 1. The first and second terminal devices 31 and 32 are arranged to allow users of the terminal devices 31 and 32 to see each other. Alternatively, depending on contents of the operation, the terminal devices 31 and 32 may be arranged at places remote from each other. For example, the first terminal device 31 may be arranged at a place where the operation of the semiconductor processing apparatus can be seen and the second terminal device 32 may be arranged in a monitoring room where the whole plant is monitored. The semiconductor processing apparatus 1 may be a substrate processing apparatus for processing a workpiece such as a silicon wafer or the like for semiconductor device manufacture, for example, a resist coating and developing apparatus, a heat treating furnace apparatus, a plasma CVD apparatus, a plasma etching apparatus, a PVD apparatus or the like. Although the semiconductor processing apparatus 1 is mainly illustrated in Embodiment 1, the present disclosure may be applied to an LCD manufacture-related processing apparatus, a solar cell manufacture-related processing apparatus, an organic EL-related processing apparatus, an information processing apparatus related to the above-mentioned processing apparatuses, etc.

Figure 2:
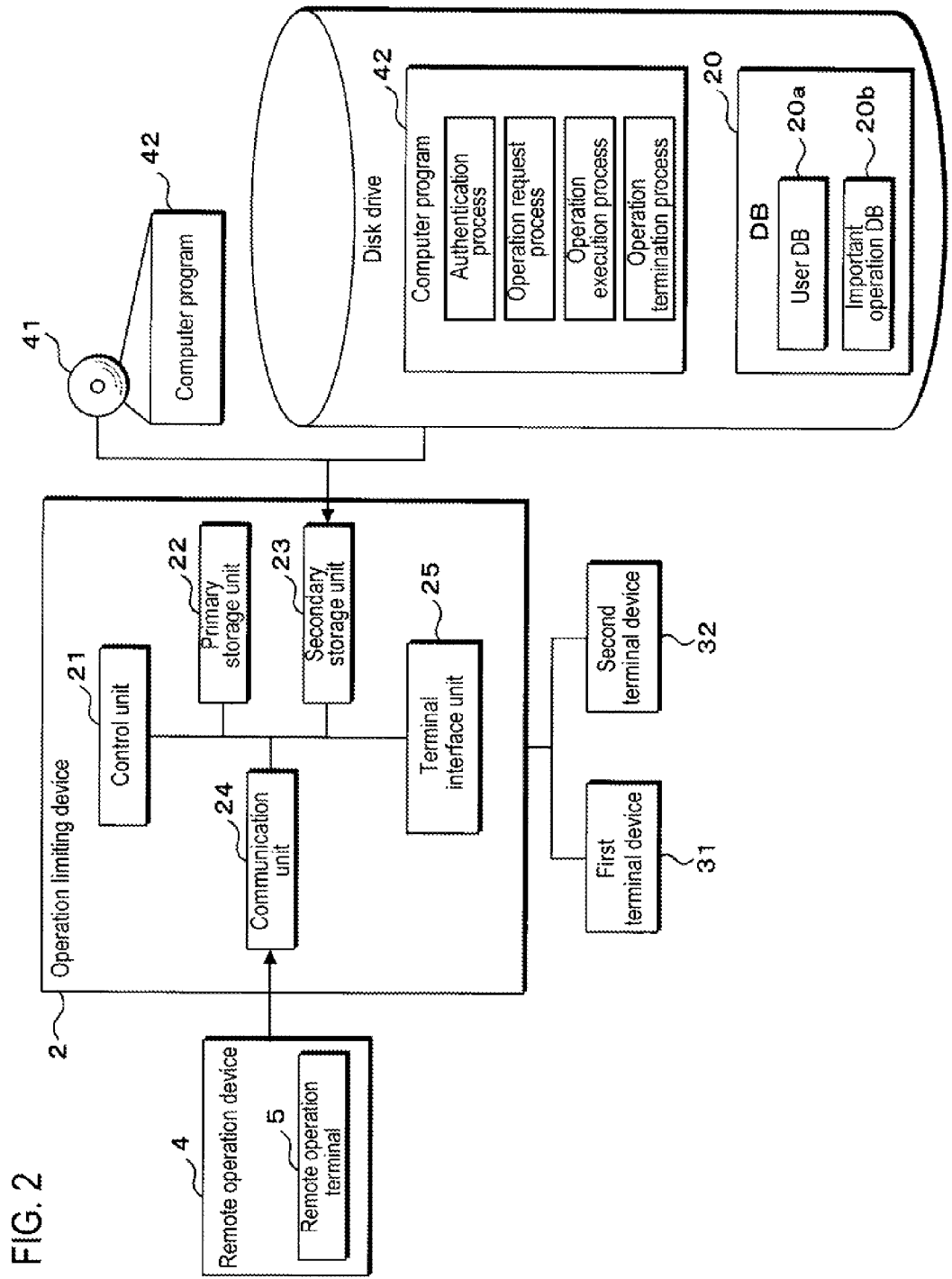
FIG. 2 is a block diagram showing one configuration example of the operation limiting device.

FIG. 2 is a block diagram showing one configuration example of the operation limiting device 2. The operation limiting device 2 is a computer including a control unit 21, for example, a CPU (Central Processing Unit), which controls operations of various components of the operation limiting device 2. The control unit 21 may be a part of a computer responsible for controlling the semiconductor processing apparatus 1. The control unit 21 is connected with a primary storage unit 22, a secondary storage unit 23, a communication unit 24 and a terminal interface unit 25 via an information transmission path.

The primary storage unit 22 is constituted by a nonvolatile memory, such as a mask ROM, EEPROM or the like, for storing a control program for an initial operation of the computer, and a volatile memory, such as a DRAM, SRAM or the like, for temporarily storing a variety of data generated when the control program for the operation of the computer or arithmetic processing of the control unit 21 is executed.

The secondary storage unit 23 may be a readable/writable disk drive such as a hard disk drive, a solid state drive or the like, or a CD-ROM drive capable of reading data from a portable recording medium 41. A computer program 42 according to Embodiment 1 is readably stored in the recording medium 41. The computer program 42 according to Embodiment 1 is stored in the recording medium 41 such as CD (Compact Disc)-ROM, DVD (Digital Versatile Disc)-ROM, BD (Blu-ray® Disc) or the like, each of which is a computer-readable portable medium. The computer program 42 is read from the recording medium 41 by the control unit 21 and is then stored in a disk drive such as a hard disk drive or a solid state drive. The control unit 21 reads the computer program 42 from the recording medium 41 or the disk drive in which the computer program 42 is stored, and stores it in the primary storage unit 22 for execution. An optical disk also is one example of the recording medium 41. The computer program 42 may be computer-readably stored in a flexible disk, a magneto-optical disk, an external hard disk, a semiconductor memory or the like, and may be read by the secondary storage unit 23. In addition, the computer program 42 according to the present disclosure may be downloaded from an external computer (not shown) connected to a communication network.

The communication unit 24 is an interface used to transmit/receive information to/from an external remote operation device 4, a remote operation terminal 5 and so on. The transmission/reception of the information by the communication unit 24 is controlled by the control unit 21.

The terminal interface unit 25 is an interface that transmits/receives information to/from the first and second terminal devices 31 and 32 for receiving a request or permission for operating the semiconductor processing apparatus 1 and performing the operation. A disk drive of the secondary storage unit 23 stores a database (DB) 20. The database 20 stores various information required to perform an operation limiting method according to Embodiment 1. For example, the database 20 includes a user DB 20a which stores information required for authentication of users and verification of rights and qualifications of users, and an important operation DB 20b which stores various information such as rights or qualifications required for main operations of the semiconductor processing apparatus 1, a terminal ID of a terminal device which allows a reception of a request or permission of the operations, a log notification destination and so on. The database 20 also stores information indicating a work schedule of the semiconductor processing apparatus 1. The work schedule may be positive information describing a work to be performed, negative information describing a work which may not be performed, or a combination thereof. The work schedule is a request from a user on an operation to be executed, and thus is a kind of the request for operating the semiconductor processing apparatus 1. In addition, the database 20 stores time information such as a duration of time required for operating the semiconductor processing apparatus 1 for each of a plurality of operations. In general, the time required for the operation is varied depending on contents of the operation.

FIG. 3 is an explanatory view conceptually showing one example of a record layout of the user DB 20a. The user DB 20a is constructed by a plurality of columns, for example, a "User ID" column, a "User Name" column, an "Authentication Information" column, and "Right" and "Qualification" columns related to each operation. Each row in the user DB 20a includes information stored for the respective columns.

The "User ID" column and the "User Name" column store identification information and names, respectively, for identifying users of the semiconductor processing apparatus 1. The "Authentication Information" column stores authentication information such as passwords and the like for authenticating the users. The "Right" column and the "Qualification" column related to each operation store rights and qualifications possessed by the users in association with contents of the important operation. The rights and the qualifications are examples of first attribute information and the second attribute information, respectively.

FIG. 4 is an explanatory view conceptually showing one example of a record layout of the important operation DB 20b. A table of the important operation DB 20b is constructed by a plurality of columns, for example, an "Important Operation Contents" column, an "Authentication Type" column, a "User" column, and a "Log Notification Destination" column. Each row in the important operation DB 20b includes information stored for the respective columns.

The "Important Operation Contents" column stores contents of an operation of the semiconductor processing apparatus 1. The "Authentication Type" column stores a type of authentication according to the importance of operation. The "User" column stores a plurality of user requirements required for the authentication type and limitations of operation terminals. The "Log Notification Destination" column stores information of a notification destination notifying information of an authentication, operation request, operation permission, operation or a state of execution of a processing related to the operation. The "authentication type" is expressed, for example, by the number of authenticated users required to release an operation-limited state and to enable the operation. The "limitations of operation terminals" are identification information associated with a terminal device allowed to receive an operation request or a terminal device permitted to receive operation permission. The notification destination information may be a user ID or a log file on a disc. If the notification destination information is a user ID, the notification may be displayed on an operation terminal operated by the user or may be sent by an e-mail to a mobile terminal possessed by the user.

In addition, the contents of the table of the important operation DB 20b may be appropriately changed by a user with a specified right or may be registered as an important work requiring an agreement between two or more users.

Figure 5:
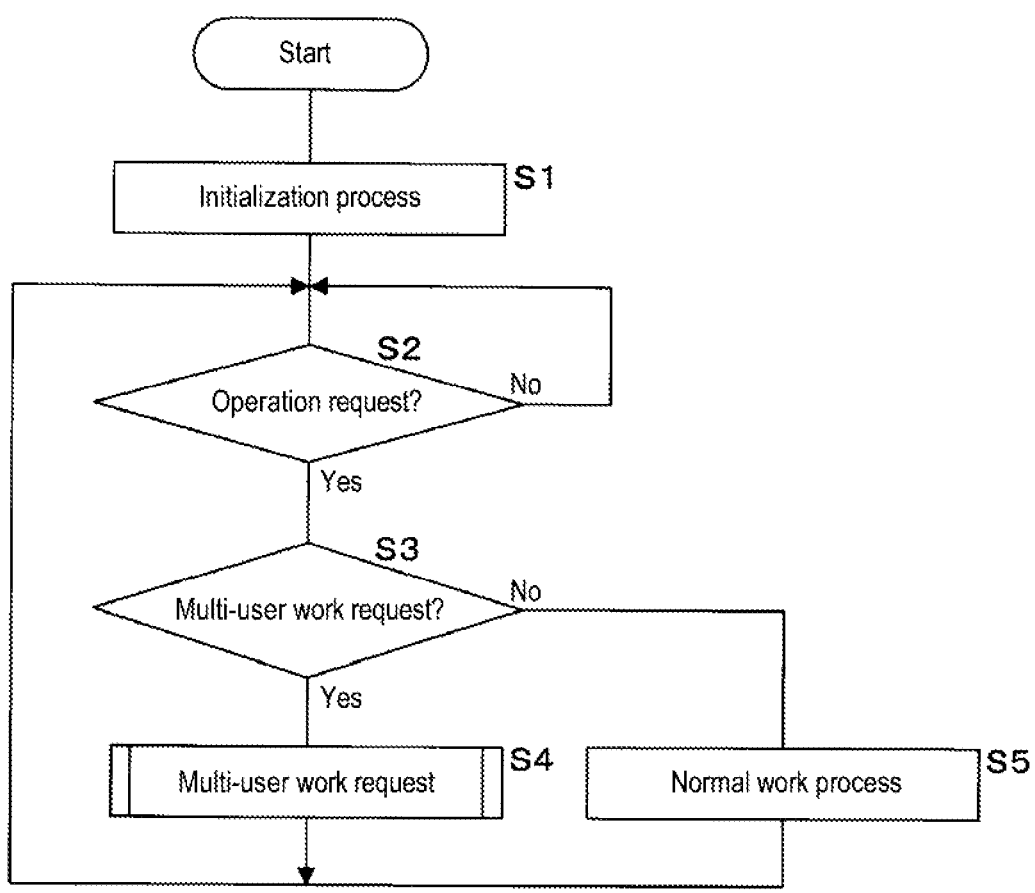
FIG. 5 is a flow chart showing a processing procedure of a control unit of the operation limiting device, the procedure relating to authentication and operability of a plurality of users.

FIG. 5 is a flow chart showing a processing procedure of the control unit 21 of the operation limiting device 2 which relates to authentication and operability of a plurality of users. First, the control unit 21 performs an initialization process required for a series of procedures (Step S1). Here, the initialization process includes a process of facilitating a log-in of a user, a process of facilitating the operation of a semiconductor manufacturing apparatus, etc. When the initialization process is terminated, the control unit 21 enters a state where an operation request can be received. A user may use one of the first and second terminal devices 31 and 32, and may log in by inputting a user ID and authentication information. The control unit 21 acquires the user ID and authentication information input to the corresponding terminal device from the terminal interface unit 25. The control unit 21 authenticates the user by comparing the acquired user ID and authentication information with a user ID and authentication information stored in the user DB 20a. Then, the authenticated user is permitted to issue a work request or reply to a request of participation in a multi-user work which is issued based the work request. Next, the control unit 21 determines whether or not an operation request is received through the terminal interface unit 25 (Step S2). If it is determined that the operation request is not received ("NO" in Step S2), the control unit 21 returns the process to Step S2 and repeats the process of Step S2. If it is determined that the operation request is received ("YES" in Step S2), the control unit 21 refers to the important operation DB 20b to determine whether or not the received operation request corresponds to important operation contents (Step S3). If it is determined that the received operation request corresponds to important operation contents ("YES" in Step S3), the control unit 21 performs a multi-user work process (Step S4). If it is determined that the received operation request does not correspond to important operation contents ("NO" in Step S3), the control unit 21 performs a normal work process (Step S5). If the corresponding process is terminated, the control unit 21 returns to an operating request waiting state to wait the next operation request. In a system where a parallel processing of a number of operations is allowed, a multi-user work request may be received in parallel while executing another multi-user work process.

Figure 6:
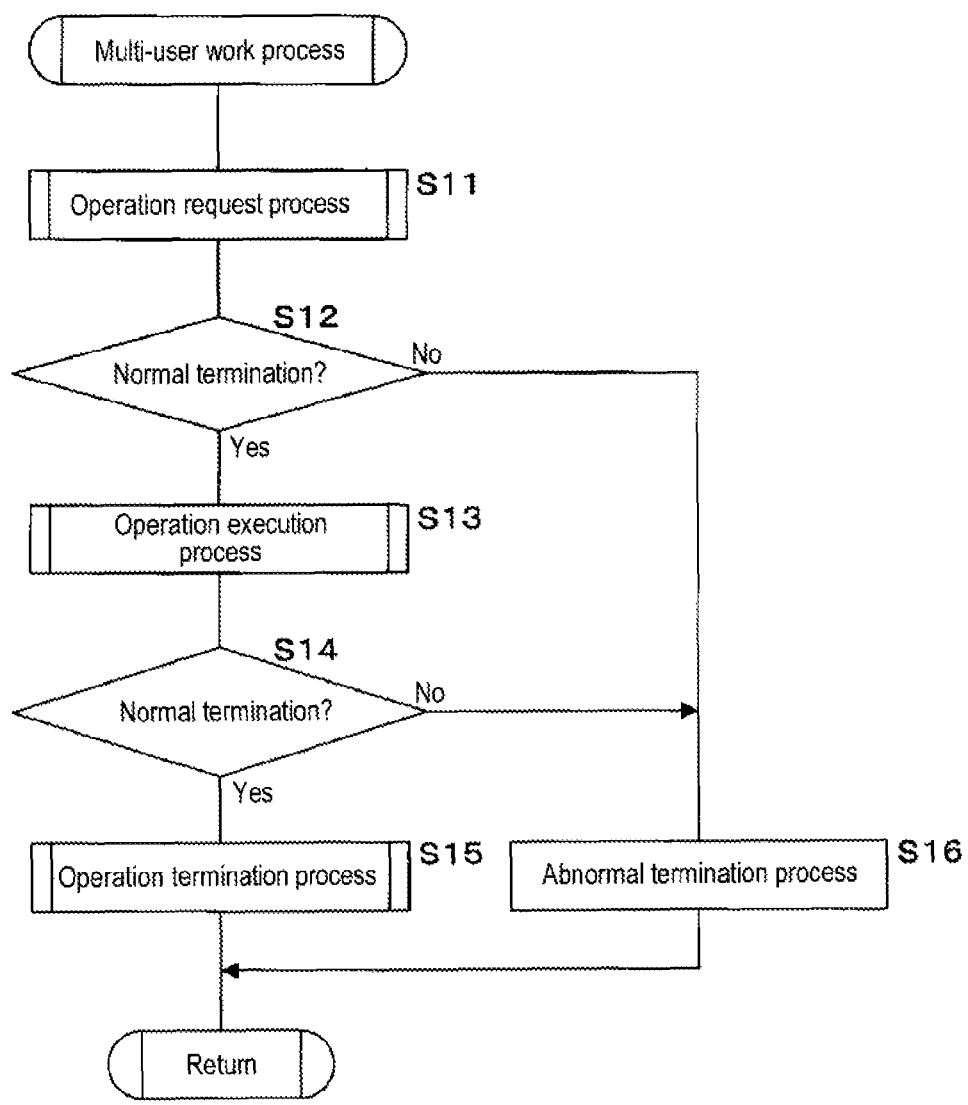
FIG. 6 is a flow chart showing the whole multi-user work process.

FIG. 6 is a flow chart showing the whole multi-user work process. The control unit 21 performs an operation request process with reference to the important operation DB 20b (Step S11) and determines whether or not the operation request process is normally terminated (Step S12). If it is determined that the operation request process is normally terminated ("YES" in Step S12), the control unit 21 performs an operation execution process (Step S13) and determines whether or not the operation execution process is normally terminated (Step S14). If it is determined that the operation execution process is normally terminated ("YES" in Step S14), the control unit 21 performs an operation termination process (Step S15) and terminates the multi-user work process. If it is determined that the operation request process is not normally terminated ("NO" in Step S12) or if it is determined that the operation execution process is not normally terminated ("NO" in Step S14), the control unit 21 performs an abnormal termination process in the flow of the multi-user work process (Step S16) and terminates the multi-user work process.

Figure 7:
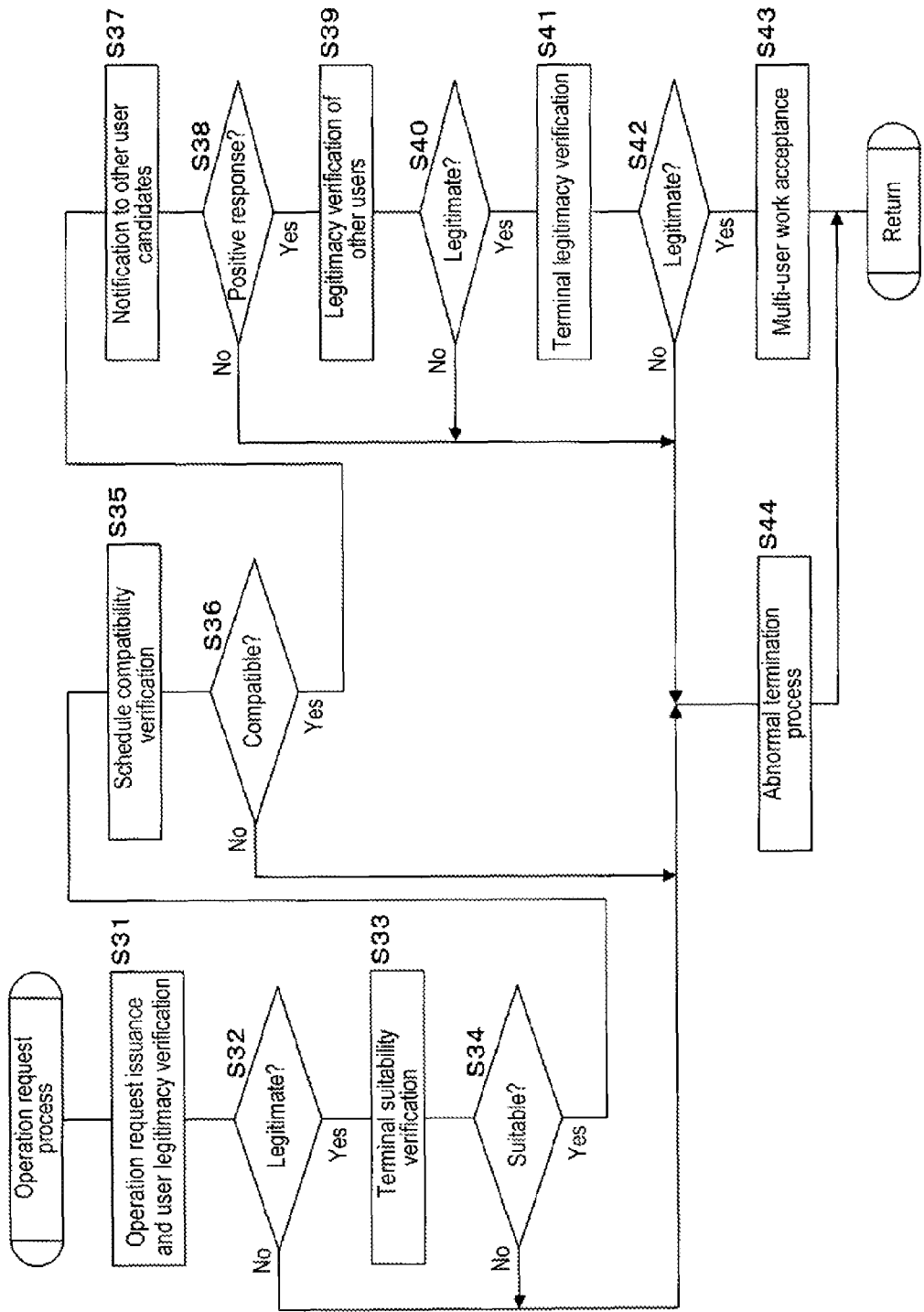
FIG. 7 is a flow chart showing a processing procedure of the control unit for the operation request process.

FIG. 7 is a flow chart showing a processing procedure of the control unit 21 for the operation request process. The control unit 21 stores a user who inputs an operation request in association with a user ID of the user, and verifies the legitimacy of the user who issued the operation request with reference to the "Requirement" column in the "User 1" column in the important operation DB 20b (Step S31). Then, the control unit 21 determines whether or not the user who issued the operation request has a legitimate requirement (Step S32).

If it is determined that the user who issued the operation request has a legitimate requirement for the operation ("YES" in Step S32), the control unit 21 determines the suitability of a terminal device which received the operation request (Step S33). More specifically, the control unit 21 acquires a terminal ID of a terminal device used by the user and verifies the suitability of the terminal device by comparing the acquired terminal ID with descriptions in the "Terminal" column in the "User 1" column in the important operation DB 20b. Then, it is determined whether or not the terminal device which received the operation request is suitable for receiving the operation request (Step S34).

If it is determined that the terminal device which received the operation request is suitable ("YES" in Step S34), the control unit 21 verifies whether or not the operation request is compatible with a work schedule indicated in advance (Step S35) and determines the compatibility thereof (Step S36). More specifically, the control unit 21 reads information of the work schedule stored in the database 20 and determines whether or not contents of the operation request received in Step S2 are compatible with the work schedule (Step S36). Here, the work schedule stored in the database 20 may be also registered as a multi-user work and may serve as a rule for the whole schedule of the corresponding semiconductor manufacturing apparatus. In addition, based on the work schedule, from the standpoint of work error prevention or the like, a user to issue the operation request or other collaborators which will be described later may be informed of a time when the operation request is started in advance.

If it is determined that the operation request issued by one user is compatible with the work schedule ("YES" in Step S36), the control unit 21 performs notification and verification for other one or more users required for the multi-user work with reference to the important operation DB 20b (Step S37). If the other users have not logged in yet, a message to urge the other users to log in is forwarded to the other users using a typical method unrelated to the present disclosure such as an e-mail to mobile phones or the like. Upon confirming the log-in of the other users, the control unit 21 sends the other users an indication urging the other users to participate in the corresponding work. Subsequently, the control unit 21 determines whether or not positive responses are received from the other users (Step S38). If it is determined that the positive responses are received from the other users ("YES" in Step S38), the control unit 21 verifies the legitimacy of User 2 or both of User 2 and User 3 with reference to the important operation DB 20b (Step S39). Then, the control unit 21 determines whether or not the user who issued the positive response has legitimate requirement for the operation (Step S40). If it is determined that the user is legitimate ("YES" in Step S40), the control unit 21 determines the suitability of a terminal device which received the positive response (Step S41). More specifically, the control unit 21 acquires a terminal ID of the terminal device used by the user and verifies the suitability of the terminal device by comparing the acquired terminal ID with descriptions in the "Terminal" column in the "User 2" or "User 3" column in the important operation DB 20b. Then, it is determined whether or not the terminal device which received the positive response is suitable (Step S42). If it is determined that the terminal device which received the positive response is suitable ("YES" in Step S42), the control unit 21 accepts the multi-user work (Step S43), terminates the operation request process, and returns to the multi-user work process of FIG. 6. More specifically, the control unit 21 facilitates an operation requested by a user in the process of Step S43.

If the requirement of the user who issued the operation request is not satisfied, the control unit 21 performs the abnormal termination process corresponding to the respective cases (Step S44) and returns to the multi-user work process of FIG. 6. For example, the requirement of the user is not satisfied: when it is determined that the user who issued the operation request is not legitimate ("NO" in Step S32); when the suitability of the terminal device of the user who issued the operation request is not satisfied ("NO" in Step S34); when the compatibility of the operation request with the work schedule is not satisfied ("NO" in Step S36); when other users cannot be brought or no positive response is obtained from other users ("NO" in Step S38); when the requirements of other users are not satisfied ("NO" in Step S40); and when the suitability of terminal devices of other users who issued the positive response is not satisfied ("NO" in Step S42).

Figure 8:
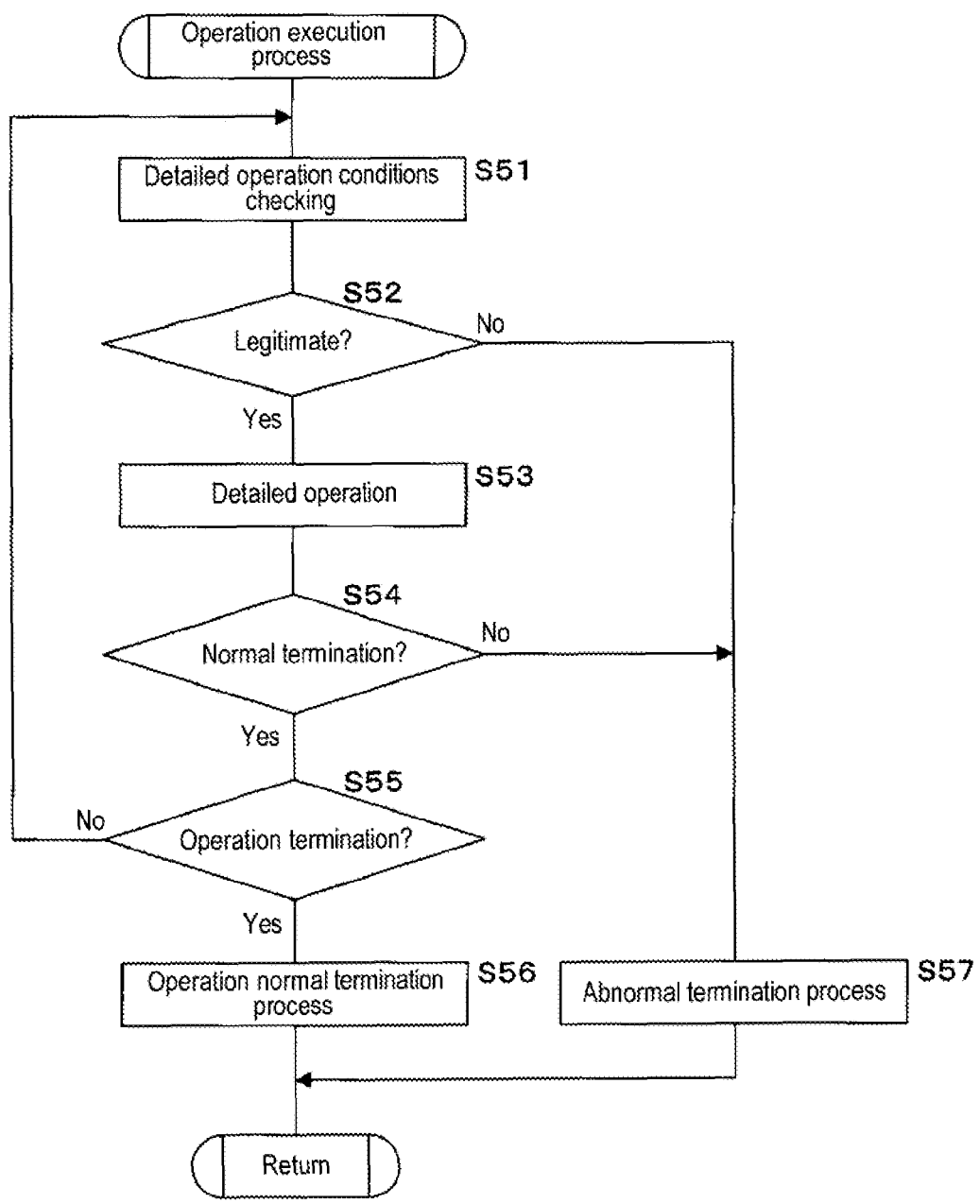
FIG. 8 is a flow chart showing an operation execution process.

FIG. 8 is a flow chart showing an operation execution process. When the operation request process is normally terminated, the control unit 21 proceeds to the operation execution process. In the operation execution process, the control unit 21 calls and executes operation programs prepared for the respective requested operations. The determination requirement common to the operation programs will be described below. The requested operation consists of one or more detailed operations and is described in the operation programs. First, the control unit 21 checks detailed operation conditions for each detailed operation (Step S51).

The checking of the detailed operation conditions includes checking whether or not a semiconductor manufacturing apparatus can deal with the requested operation or a series of detailed operations constituting the requested operation, checking whether a confirmative keystroke response made by a user who operates a terminal based on the importance of the requested operation, re-checking the user authentication information of the user, and so on. In addition, the checking of the detailed operation conditions may include checking whether or not a predetermined period of time according to the operation contents elapses after the multi-user work is accepted in Step S43. The lapse time after the acceptance of the multi-user work in Step S43 may be detected by a time counter (not shown) under a control of the control unit 21. After the lapse time elapses, the operation enabled state may be released. More specifically, if there is no problem in safety, the operation enabled state may be simply released. If there is a problem in safety, the operation enabled state may be released according to a predetermined procedure when an appropriate automatic procedure can be set. If it is difficult to set the automatic procedure, the operation enabled state may be released after receiving a confirmation indication from a user of the semiconductor processing apparatus 1. In addition, the predetermined time according to the operation contents is stored in, for example, the operation program. The control unit 21 determines whether or not the detailed operations are legitimate, i.e., whether or not the detailed operation execution conditions are satisfied (Step S52). If it is determined that the detailed operations are legitimate ("YES" in Step S52), the control unit 21 executes the detailed operations described in the operation program (Step S53). Next, the control unit 21 determines whether or not the executed detailed operations are normally terminated (Step S54). If it is determined that the executed detailed operations are normally terminated ("YES" in Step S54), the control unit 21 determines whether or not all detailed operations described in the operation program are executed (Step S55). If it is determined that there exists any executed detailed operation ("NO" in Step S55), the control unit 21 returns the process to Step S51 and repeats the processes of Step S51 to Step S55 until all detailed operations are terminated. If it is determined that all detailed operations are executed ("YES" in Step S55), the control unit 21 performs an operation normal termination process (Step S56) and returns to the multi-user work process of FIG. 6. If it is determined, based on the checking the detailed operation conditions, that the detailed operations are not legitimate ("NO" in Step S52) or if it is determined that any detailed operation is not normally terminated ("NO" in Step S54), the control unit 21 performs an abnormal termination process corresponding to the respective situations (Step S57) and returns to the multi-user work process of FIG. 6.

Figure 9:
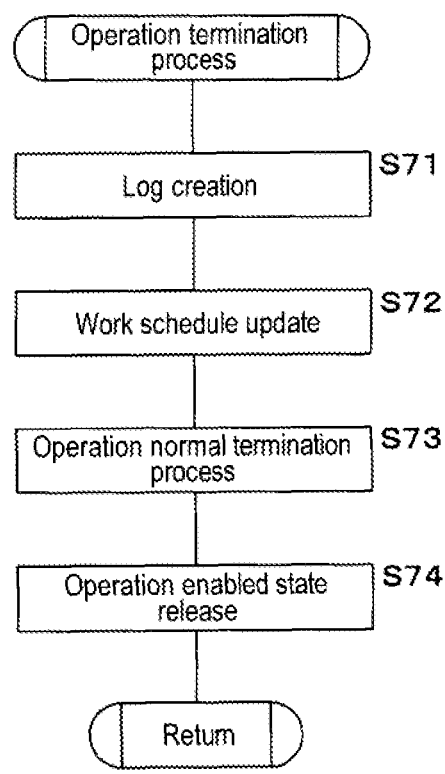
FIG. 9 is a flow chart showing an operation termination process.

FIG. 9 is a flow chart showing an operation termination process. When the operation execution process is normally terminated, the control unit 21 performs the operation termination process. In the operation termination process, the control unit 21 creates a log including information indicating operation permission, the operation or a state where the processing related to the operation is performed, and stores the log in the database 20 (Step S71). Next, the control unit 21 describes a result of the work achieved by the operation in a work schedule (Step S72). Then, the control unit 21 specifies a log notification destination with reference to the important operation DB 20b and transmits, to the specified log notification destination, the log including information indicating operation permission, the operation or a state where the processing related to the operation is performed, information indicating a normal termination of the operation, etc. (Step S73). Then, the control unit 21 releases the operation enabled state, i.e., a state where the operation is allowed to be performed in the process of Step S43 (Step S74).

In addition, although not shown in the flow charts of FIGS. 5 to 8, whenever the authentication of Users A and B, operation request, operation permission, operation-related processing or the like is performed, the control unit 21 stores, in the secondary storage unit 23 or the database 20, information indicating a performed-state of the authentication, the operation request, the operation permission, the operation or the operation-related processing. In addition, the control unit 21 performs a process of informing a log notification destination, which is registered in the important operation DB 20b, of the information indicating the performed-state of the authentication, the operation request, the operation permission, the operation and the operation-related processing. The control unit 21 finalizes the above-described log and notification, describes a result of the work performed by the operation in the work schedule, and informs a required user of the operation normal termination.

Similarly, when the operation execution process is abnormally terminated, the control unit 21 performs the abnormal termination process. In addition, the control unit 21 creates an operation log, describes a result of the work performed by the operation in the work schedule, and informs a required user of the operation abnormal termination. When the multi-user work process is terminated, the control unit 21 returns to Step S2 of FIG. 5 where an operation request is waited.

FIGS. 10 to 14 are explanatory views conceptually showing a procedure of an operation enabling process between Users A and B and the control unit 21. In these figures, arrows represent a direction in which the procedure is performed, and characters in the arrows represent contents of the procedure.

Figure 10:
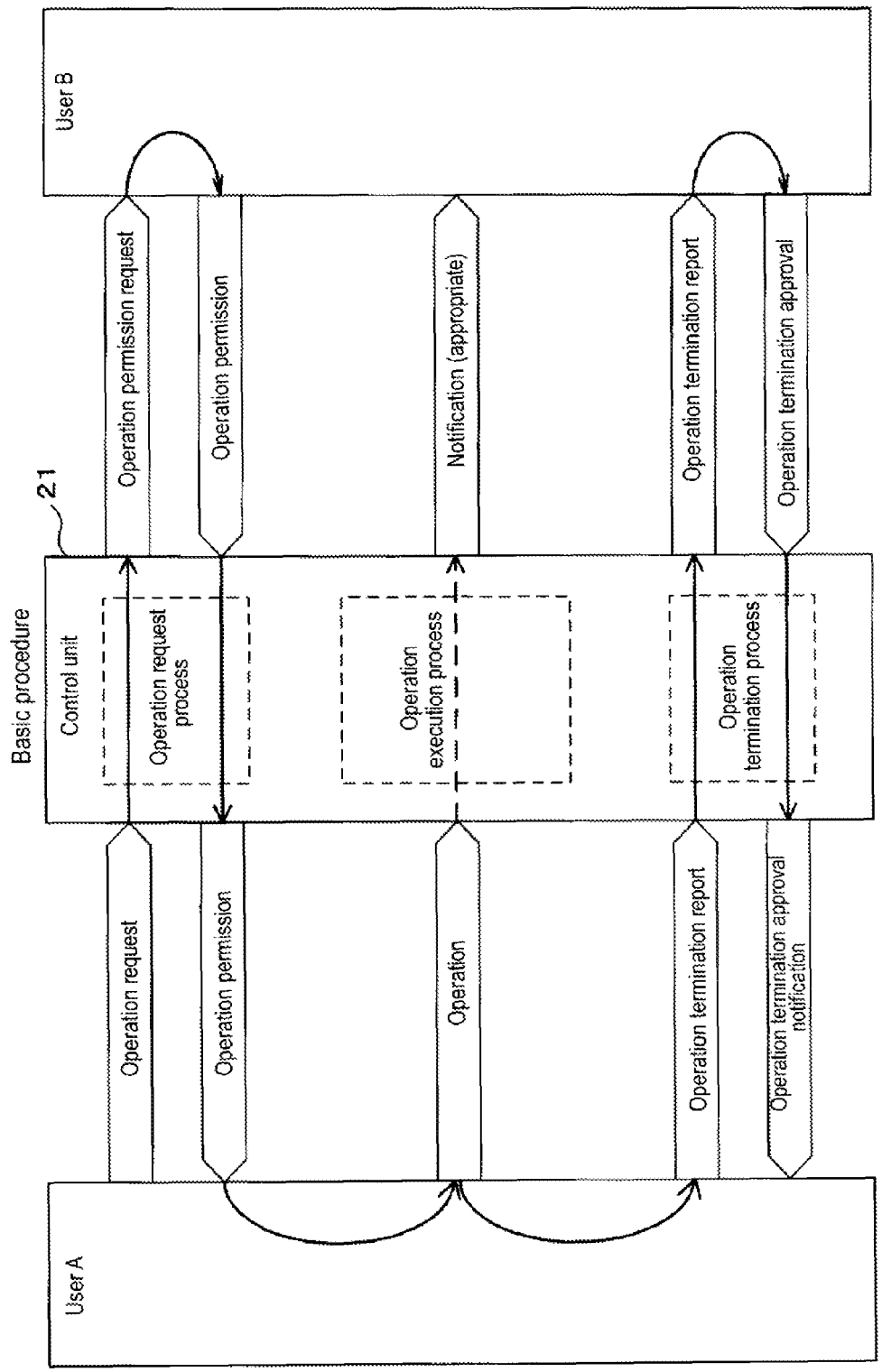
FIG. 10 shows an explanatory view conceptually showing a procedure of operation enabling process between users and the control unit.

FIG. 10 shows a basic procedure. When User A issues an operation request, the control unit 21 starts an operation request process and checks the requirement of User A with reference to the important operation DB 20b. If User A is legitimate, the control unit 21 issues an operation permission request to one or more users, other than User A, corresponding to the requirement of User 2 with reference to the important operation DB 20b. In FIG. 10, the operation permission request is issued to User B. When User B issues operation permission, the control unit 21 delivers the operation permission to User A and starts a corresponding operation program to perform an operation execution process. User A executes an operation and the control unit 21 executes the operation program to control the semiconductor manufacturing apparatus according to the operation. Information on the above-described execution and reflection of the operation may be appropriately reported to User B. When the operation is terminated, User A issues an operation termination report and the control unit 21 receiving this report proceeds to an operation termination process. Then, the control unit 21 issues the operation termination report to User B. Upon receipt of the operation termination report, User B issues an operation termination approval, the control unit 21 issues an operation termination approval notification and transmits it to User A and terminates a series of operations.

Figure 11:
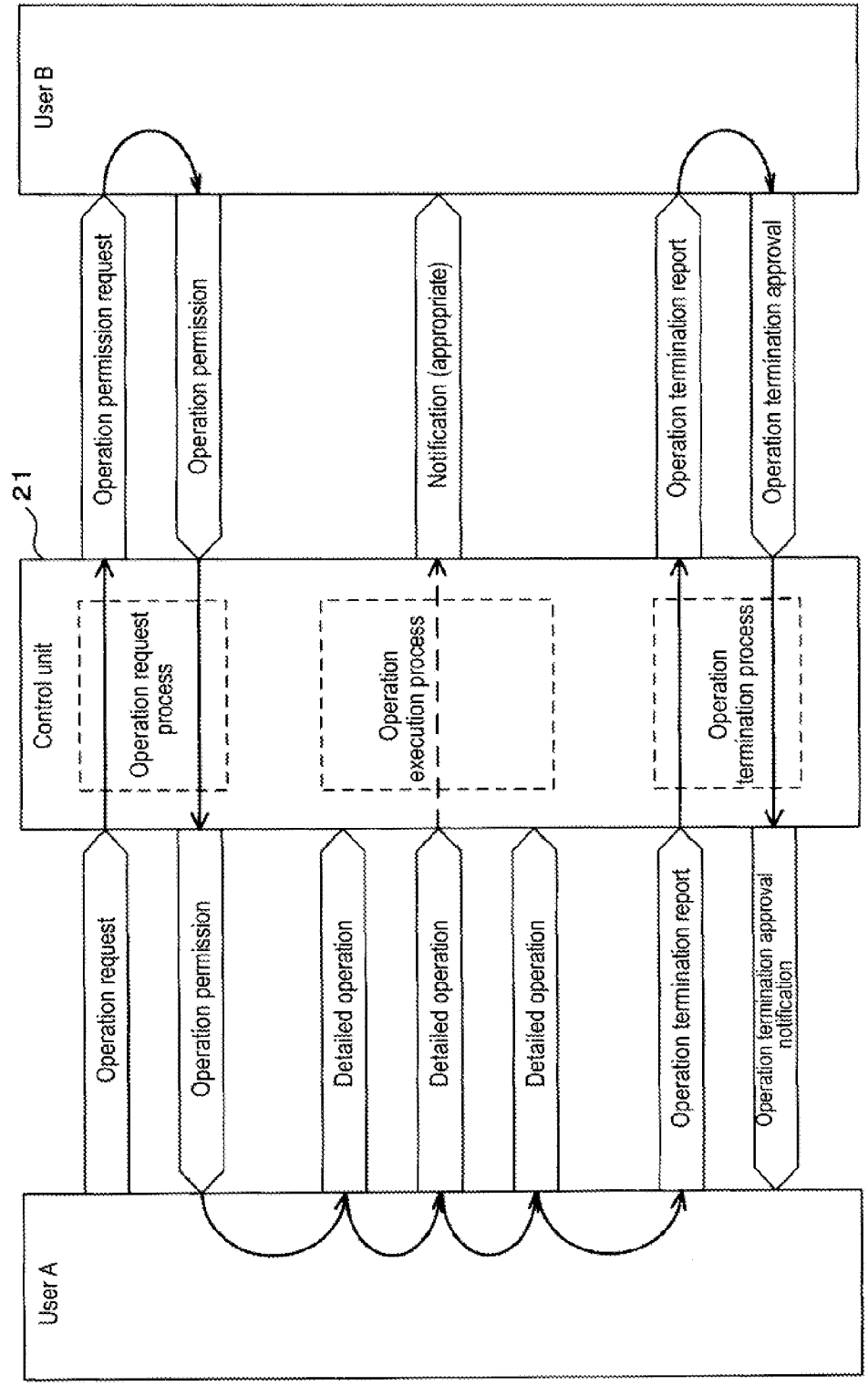
FIG. 11 shows an explanatory view conceptually showing another procedure of operation enabling process between the users and the control unit.

FIG. 11 shows a procedure when a single operation request is achieved by a plurality of detailed operations. In FIG. 11, an operation request process and an operation termination process are the same as those in FIG. 10, but an operation execution process consists of a plurality of detailed operations and may be appropriately reported to User B. This method enables the operation request and permission to be performed in the unit of the detailed operation group, which eliminates the need to issue individual operation request and permission for each detailed operation. This allows the operation of the semiconductor processing apparatus 1 to progress with efficiency while properly maintaining the security or safety of the semiconductor processing apparatus 1.

Figure 12:
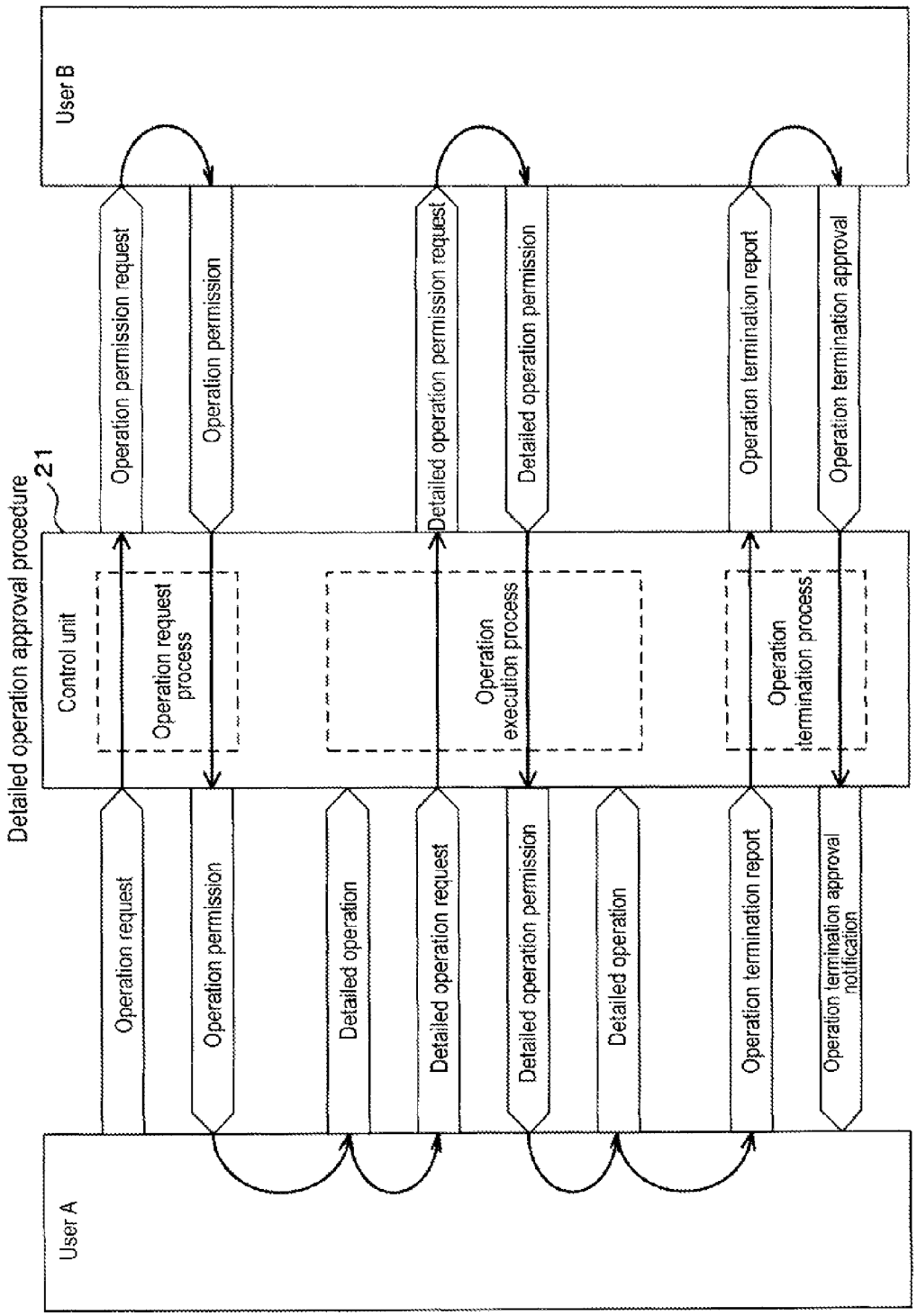
FIG. 12 shows an explanatory view conceptually showing still another procedure of operation enabling process between the users and the control unit.

FIG. 12 is shows a detailed operation approval procedure. Here, an operation execution process requests User A to issue a detailed operation request before executing an important detailed operation. Upon receiving the detailed operation request, the operation execution process issues a detailed operation permission request to User B. When User B issues a detailed operation permission, the operation execution process issues the detailed operation permission to User A, thereby allowing User A to continue the detailed operation.

Figure 13:
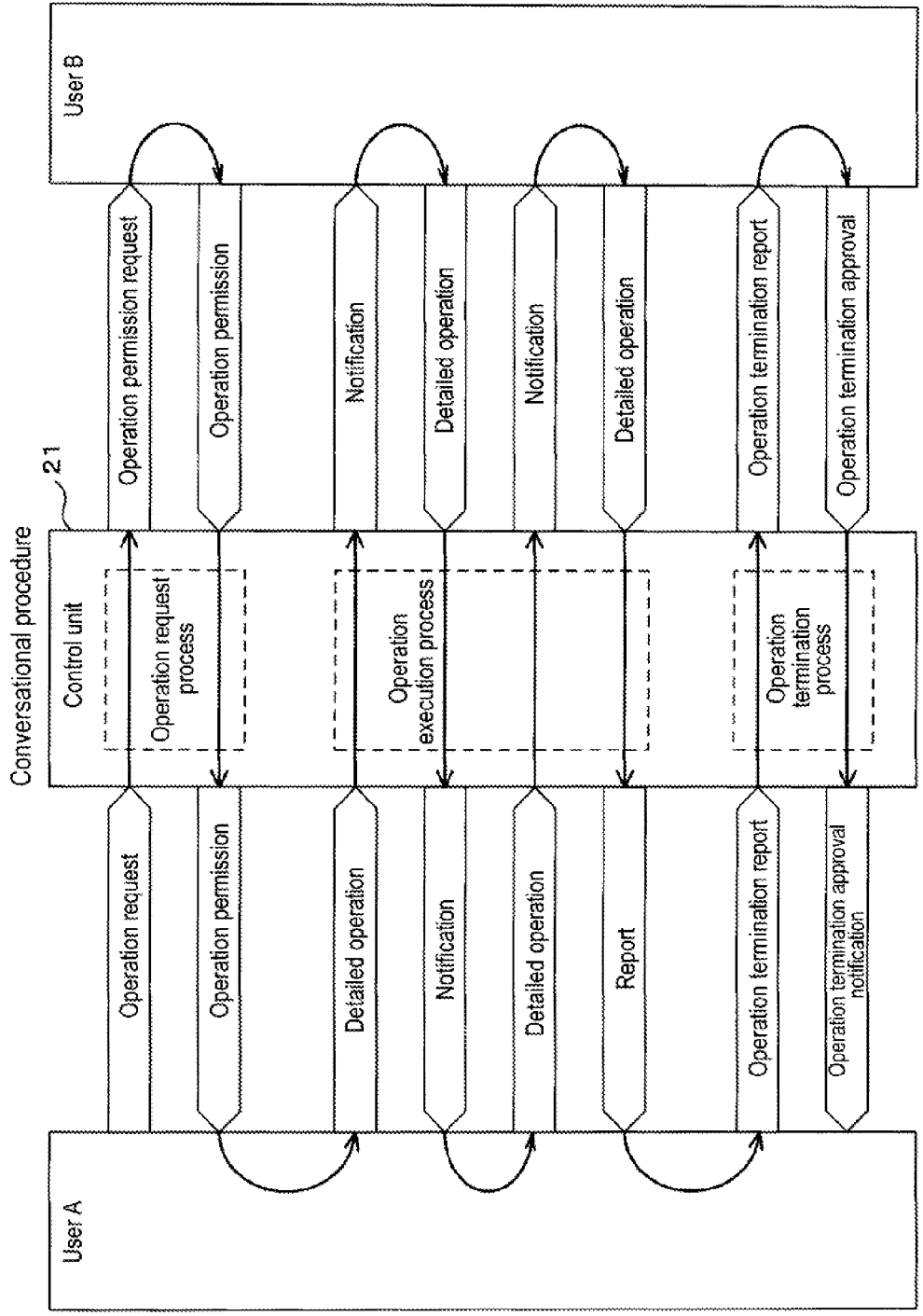
FIG. 13 shows an explanatory view conceptually showing still another procedure of operation enabling process between the users and the control unit.

FIG. 13 is an explanatory view conceptually showing an operation execution process performed on a conversation basis. Information of a detailed operation by User A is reported to User B by the control unit 21, User B executes a detailed operation based on the reported information, and information about the executed detailed operation is reported to User A by the control unit 21. Thus, User A and User B can progress the detailed operation while alternatively confirming the detailed operation executed by the counterpart on a conversation basis. The operation by User A acts as a permission for the next operation by User B and the operation by User B acts as a permission for the next operation by User A.

Figure 14:
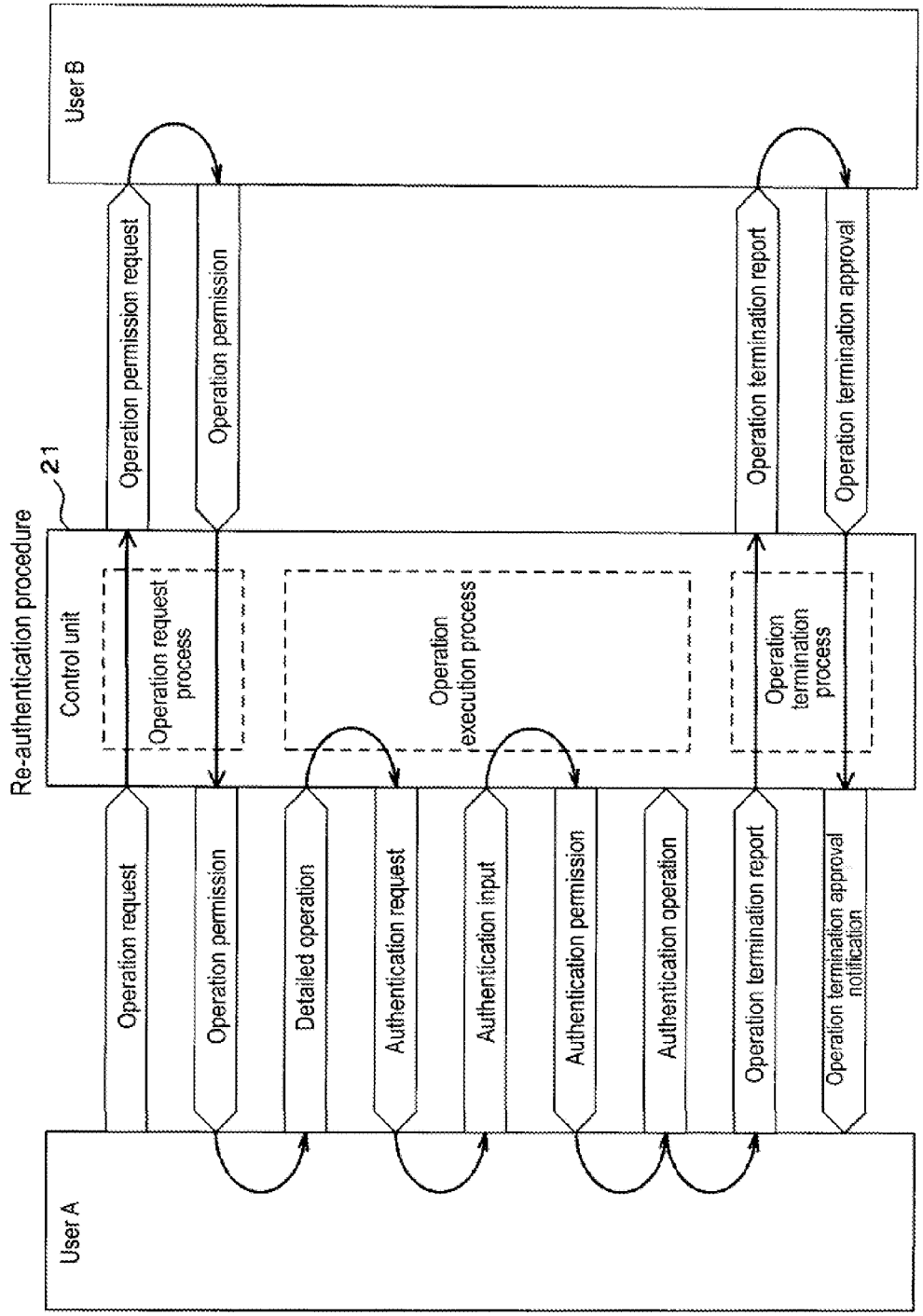
FIG. 14 shows an explanatory view conceptually showing still another procedure of operation enabling process between the users and the control unit.

FIG. 14 shows a re-authentication procedure performed before executing a particularly important detailed operation. The control unit 21 can issue an authentication request to User A before executing the particularly important detailed operation during the operation execution process, and User A performs an authentication input. The control unit 21 performs by comparing authentication information obtained by the authentication input with authentication information stored in the user DB 20a. If the obtained authentication information matches the stored authentication information, the control unit 21 grants authentication permission to User A, thereby allowing User A to perform the detailed operation.

In Embodiment 1, operation permission is performed after authenticating Users A and B and confirming that an agreement and a permission are exchanged between Users A and B in attendance. Accordingly, it is possible to realize more robust security relating to processing of a workpiece by the semiconductor processing apparatus 1. For example, it is possible to effectively prevent recipes relating to processing of workpieces from being brought out.

In addition, since the operation permission and the operation enabled state release are performed on an operation basis or on a detailed operation group basis, it is possible to realize more robust security.

In addition, since an operation can be performed when an operation request or permission is received from a plurality of users having the right or qualification preset depending on the operation importance, it is possible to guarantee more proper security relating to processing of workpieces.

In addition, since the operation permission and release are performed on a plurality of groups of detailed operations basis depending on operation contents, it is possible to guarantee more proper security relating to processing of workpieces while reducing inconvenience of the operation permission procedure.

In addition, by storing the information indicating a performed-state of an authentication, operation request, operation permission, operation or operation-related processing and by informing a particular user of the stored information, it is possible to indirectly improve security relating to processing of workpieces.

In addition, even if operation request and permission by multiple users are present, no operation is permitted if the operation request and permission are incompatible with contents of the registered work schedule, thereby further improving security relating to processing of workpieces.

In addition, a user authorized to change the rights of other users can dynamically change the rights of other users.

In addition, although it has been illustrated in Embodiment 1 that User A performs the operation request and subsequently User B performs the operation permission, reversely, the operation request may be first performed and the operation permission may be then performed, or the operation request and the operation permission may be simultaneously performed. In addition, an operator of the semiconductor processing apparatus 1 may perform the operation request and the operation permission. In addition, a non-operator who does not operate the semiconductor processing apparatus 1 directly may perform the operation request and the operation permission.

In addition, although it has been illustrated in the above that the operation request and the operation permission are respectively performed by the respective users, the operation request and the operation permission may be received and performed by three or more users.

In addition, not only a user having the higher right or qualification may permit an operation request by a user having the lower right or qualification, but also a user having the lower right or qualification may permit an operation request by a user having the higher right or qualification. In addition, a plurality of users having the equivalent right or qualification may perform the operation request and permission.

In addition, although it has been illustrated in the above that the operation request is input by a user, the semiconductor processing apparatus 1 or the operation limiting device 2 may issue a registered operation request and a corresponding operation may be permitted by other users.

In addition, although it has been illustrated in Embodiment 1 that the first and second terminal devices 31 and 32 arranged to be seen from each other receive the operation request and permission, the first and second terminal devices 31 and 32 may be arranged at different places separated from each other depending on the operation importance.

<Embodiment 2>

Figure 15:
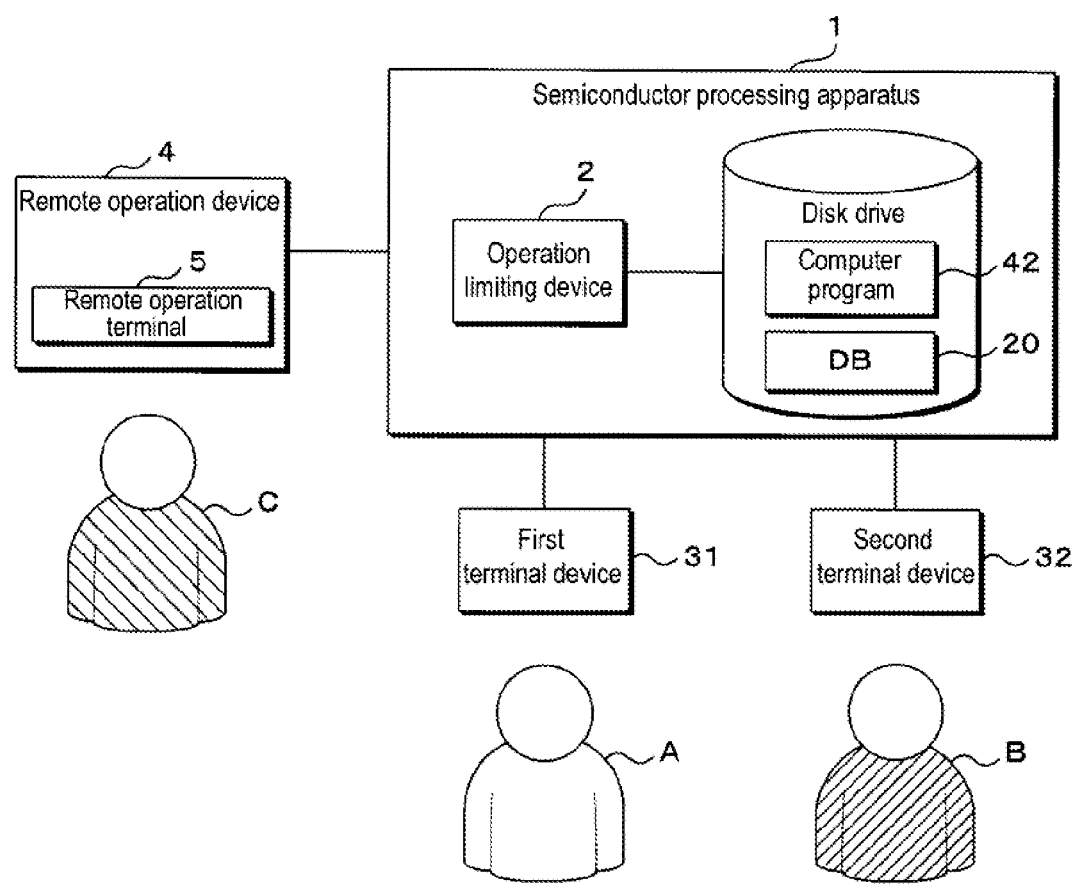
FIG. 15 is a block diagram showing one configuration example of a semiconductor processing apparatus including an operation limiting device according to Embodiment 2.

FIG. 15 is a block diagram showing one configuration example of a semiconductor processing apparatus including an operation limiting device 2 according to Embodiment 2. The semiconductor processing apparatus 1 according to Embodiment 2 is connected, via a wired or wireless communication line, with a remote operation device 4 which remotely operates the semiconductor processing apparatus 1. The remote operation device 4 is provided with a remote operation terminal 5. In Embodiment 2, the control unit 21 of the operation limiting device 2 receives, via a communication unit 24, an operation request input to the remote operation device 4 by an authenticated User C. Upon receiving an operation permission input to the first and second terminal devices 31 and 32 by authenticated Users A and B, the control unit 21 of the operation limiting device 2 can execute the operation. The control unit 21 has the same processing procedure as that in Embodiment 1 except positions of terminal devices to receive an operation request and the number of users to obtain the operation permission.

In Embodiment 2, the operation request input by User C who cannot see the state of the semiconductor processing apparatus 1 is permitted by Users A and B who can see the state of the semiconductor processing apparatus 1. Accordingly, it is possible to realize safety relating to processing of workpieces using the semiconductor processing apparatus 1.

In addition, since the first and second terminal devices 31 and 32 arranged to be seen from each other can receive the operation permission, it is possible to realize more robust security relating to processing of workpieces using the semiconductor processing apparatus 1, like Embodiment 1.

Besides, like Embodiment 1, it is possible to realize robust security and safety relating processing of workpieces.

The disclosed embodiments have been presented by way of example only, and are not intended to limit the scope of the disclosures. The scope of the disclosures is defined by the accompanying claims, not the descriptions and the drawings. The accompanying claims and their equivalents are intended to cover such forms or modifications as would fall within the scope and spirit of the disclosures.

EXPLANATION OF REFERENCE NUMERALS

1: semiconductor processing apparatus
2: operation limiting device
4: remote operation device
5: remote operation terminal
20: database
20a: user DB
20b: important operation DB
21: control unit
22: primary storage unit
23: secondary storage unit
24: communication unit
25: terminal interface unit
31: first terminal device
32: second terminal device
41: recording medium
42: computer program

What is claimed is:

1. An operation limiting device that limits an operation relating to a processing of a workpiece by a processing apparatus, comprising:
   a memory that stores authentication information of users, and a first attribute information and a second attribute information of the users in association with the authentication information of the users;
   a terminal interface transmitting/receiving information to/from a plurality of terminal devices; and
   a controller connected to the plurality of terminal devices via the terminal interface and configured to:
      authenticate each of a plurality of users,
      receive a request of the operation or permission of the operation from the plurality of users,
      enable the operation, if the plurality of users using different terminal devices is authenticated, if the operation request is received from an authenticated user having at least one of the first attribute information and the second attribute information, and if the operation permission is received from an authenticated user having the at least one of the first attribute information and the second attribute information, which is different from that of the authenticated user requesting the operation request, and
      release an operation enabled state if the processing relating to the operation is terminated or if a predetermined period of time according to the operation elapses after the enablement of the operation,
   wherein the first attribute information is information for guaranteeing security relating to the processing of the workpiece and the second attribute information is information for guaranteeing safety relating to the processing of the workpiece.

2. The operation limiting device of claim 1, wherein the memory stores the first attribute information and the second attribute information required for the operation request and permission based on importance of each of a plurality of operations.

3. The operation limiting device of claim 1, wherein the controller is configured to enable the operation by receiving the operation request or permission from a plurality of authenticated users at one or more required portions in a series of operations.

4. The operation limiting device of claim 1, wherein the controller is configured to:
   receive a first operation request from a first authenticated user and a first operation permission from a second authenticated user; and
   receive a second operation request from the second authenticated user and a second operation permission from the first authenticated user.

5. The operation limiting device of claim 1, wherein the controller is configured to receive the operation request or permission in at least one terminal device arranged at a position where a state of the processing apparatus is confirmed.

6. The operation limiting device of claim 1, wherein the controller is configured to receive the operation request or permission in terminal devices arranged to be seen from each other by a plurality of users.

7. The operation limiting device of claim 1, further comprising:
   a memory that stores identification information associated with a terminal device permitted to receive the operation request or a terminal device permitted to receive the operation permission,
   wherein the controller is configured to enable the operation if the operation request or permission is received from the terminal device associated with the stored identification information.

8. The operation limiting device of claim 1, wherein the controller is further configured to notify a specified user of information indicating a performed-state of the authentication, the operation request, the operation permission, the operation or the processing relating to the operation.

9. The operation limiting device of claim 1, further comprising:
   a memory that stores a performed-state of the authentication, the operation request, the operation permission, the operation or the processing relating to the operation.

10. An operation limiting method for limiting an operation relating to a processing of a workpiece by a processing apparatus, comprising:
   authenticating a plurality of users;
   receiving a request of the operation or permission of the operation from the plurality of users;
   enabling the operation, if the plurality of users using different terminal devices is authenticated, if the operation request is received from an authenticated user having at least one of first attribute information, which is information for guaranteeing security relating to the processing of the workpiece, and second attribute information, which is information for guaranteeing safety relating to the processing of the workpiece, and if the operation permission is received from an authenticated user having the at least one of the first attribute information and the second attribute information, which is different from that of the authenticated user requesting the operation request; and releasing an operation enabled state if the processing relating to the operation is terminated or if a predetermined period of time according to the operation elapses after the enablement of the operation.

11. A non-transitory computer-readable storage medium that stores computer program which causes a computer to limit an operation relating to a processing of a workpiece by a processing apparatus, the computer program causing the computer to:

authenticate a plurality of users;

receive a request of the operation or permission of the operation from the plurality of users;

enable the operation, if the plurality of users using different terminal devices is authenticated, if the operation request is received from an authenticated user having at least one of first attribute information, which is information for guaranteeing security relating to the processing of the workpiece, and second attribute information, which is information for guaranteeing safety relating to the processing of the workpiece, and if the operation permission is received from an authenticated user having the at least one of the first attribute information and the second attribute information, which is different from that of the authenticated user requesting the operation request; and release an operation enabled state set by the operation enabling unit if the processing relating to the operation is terminated or if a predetermined period of time according to the operation elapses after the enablement of the operation.

* * * * *